(12) United States Patent
Zhang et al.

(10) Patent No.: US 10,944,087 B2
(45) Date of Patent: Mar. 9, 2021

(54) SEPARATORS, BATTERIES, SYSTEMS, VEHICLES, AND RELATED METHODS

(71) Applicant: CELGARD, LLC, Charlotte, NC (US)

(72) Inventors: Xiaomin Zhang, Charlotte, NC (US); Gerald P. Rumierz, Fort Mill, SC (US); Karl F. Humiston, Tucson, AZ (US); Charles E. Haire, Lancaster, SC (US); Tyrone S. Fields, Charlotte, NC (US); Michael A. Braswell, Charlotte, NC (US); Ronald A. Proctor, York, SC (US); Ronnie E. Smith, Huntersville, NC (US)

(73) Assignee: Celgard, LLC, Charlotte, NC (US)

( * ) Notice: Subject to any disclaimer, the term of this patent is extended or adjusted under 35 U.S.C. 154(b) by 98 days.

(21) Appl. No.: 16/070,817

(22) PCT Filed: Jan. 27, 2017

(86) PCT No.: PCT/US2017/015230
§ 371 (c)(1),
(2) Date: Jul. 18, 2018

(87) PCT Pub. No.: WO2017/132439
PCT Pub. Date: Aug. 3, 2017

(65) Prior Publication Data
US 2019/0027725 A1    Jan. 24, 2019

Related U.S. Application Data

(63) Continuation of application No. 15/009,888, filed on Jan. 29, 2016.

(51) Int. Cl.
*H01M 2/16* (2006.01)
*H01M 2/18* (2006.01)
(Continued)

(52) U.S. Cl.
CPC ....... *H01M 2/1653* (2013.01); *B29C 48/0018* (2019.02); *B29C 48/08* (2019.02);
(Continued)

(58) Field of Classification Search
CPC .. H01M 2/145; H01M 2/1653; H01M 2/1686; H01M 2/18; H01M 10/0525;
(Continued)

(56) References Cited

U.S. PATENT DOCUMENTS 6,057,061 A    5/2000  Callahan et al.
6,080,507 A    6/2000  Yu
(Continued)

OTHER PUBLICATIONS

Kesting, Robert E., "Synthetic Polymeric Membranes, A Structural Perspective," 2nd ed., John Wiley and Sons (New York, NY), (p. 237-286), (1985).
(Continued)

*Primary Examiner* — Brittany L Raymond
(74) *Attorney, Agent, or Firm* — Hammer & Associates, P.C.

(57) ABSTRACT

Improved battery separators, base films or membranes and/or a method of making or using such separators, base films or membranes are provided. The preferred inventive separators, base films or membranes are made by a dry-stretch process and have improved strength, high porosity, high charge capacity and high porosity to provide excellent charge rate and/or charge capacity performance in a rechargeable battery.

21 Claims, 4 Drawing Sheets

(51) Int. Cl.
| | |
|---|---|
| *B29C 47/00* | (2006.01) |
| *B29C 47/06* | (2006.01) |
| *B29C 65/00* | (2006.01) |
| *B29C 47/92* | (2006.01) |
| *B29C 48/00* | (2019.01) |
| *B29C 48/21* | (2019.01) |
| *B29C 48/92* | (2019.01) |
| *B29C 48/08* | (2019.01) |
| *B29C 48/10* | (2019.01) |
| *B29C 48/18* | (2019.01) |
| *B29C 55/00* | (2006.01) |
| *B29C 48/32* | (2019.01) |
| *B29C 48/88* | (2019.01) |
| *B29C 55/14* | (2006.01) |
| *B29C 55/16* | (2006.01) |
| *B29D 99/00* | (2010.01) |
| *B29K 23/00* | (2006.01) |
| *B29L 31/34* | (2006.01) |
| *B29L 31/00* | (2006.01) |
| *H01M 2/14* | (2006.01) |
| *H01M 10/0525* | (2010.01) |

(52) U.S. Cl.
CPC ............ *B29C 48/10* (2019.02); *B29C 48/18* (2019.02); *B29C 48/21* (2019.02); *B29C 48/92* (2019.02); *B29C 55/005* (2013.01); *B29C 65/00* (2013.01); *H01M 2/1686* (2013.01); *H01M 2/18* (2013.01); *B29C 48/32* (2019.02); *B29C 48/917* (2019.02); *B29C 55/14* (2013.01); *B29C 55/16* (2013.01); *B29C 2948/92704* (2019.02); *B29D 99/005* (2013.01); *B29K 2023/12* (2013.01); *B29L 2031/3468* (2013.01); *B29L 2031/755* (2013.01); *H01M 2/145* (2013.01); *H01M 10/0525* (2013.01); *H01M 2220/20* (2013.01); *H01M 2220/30* (2013.01); *Y02E 60/10* (2013.01)

(58) Field of Classification Search
CPC .......... H01M 2220/20; H01M 2220/30; Y02E 60/122; B29C 48/0018; B29C 48/08; B29C 48/10; B29C 48/18; B29C 48/21; B29C 48/30; B29C 48/32; B29C 48/917; B29C 48/92; B29C 55/005; B29C 55/14; B29C 55/16; B29C 65/00; B29C 2948/92704; B29D 99/005; B29K 2023/12; B29L 2031/755
See application file for complete search history.

(56) References Cited

U.S. PATENT DOCUMENTS

| | | |
|---|---|---|
| 8,795,565 B2 | 8/2014 | Wei et al. |
| 2007/0196638 A1* | 8/2007 | Wei .................. B29C 55/143 428/304.4 |
| 2011/0223486 A1 | 9/2011 | Zhang et al. |

OTHER PUBLICATIONS

Kesting, Robert E., "Synthetic Polymeric Membranes, A Structural Perspective," 2nd ed., John Wiley and Sons (New York, NY), (p. 290-297), (1985).

EP Office Action dated Feb. 5, 2020; from EP counterpart Application No. 17744931.1.

\* cited by examiner

SEPARATORS, BATTERIES, SYSTEMS, VEHICLES, AND RELATED METHODS

CROSS-REFERENCE TO RELATED APPLICATION

This patent application claims priority to and the benefit of U.S. patent application Ser. No. 15/009,888, filed Jan. 29, 2016, hereby fully incorporated by reference herein.

FIELD OF THE INVENTION

In accordance with at least selected embodiments, the present invention or application is directed to novel or improved battery separators, base films or membranes, batteries, cells, devices, systems, and/or vehicles, and/or methods of making and/or using such separators, films or membranes, batteries, cells, devices, systems, and/or vehicles, and/or the like. In accordance with at least certain embodiments the present invention or application is directed to biaxially oriented porous membranes, composites including biaxially oriented porous membranes, biaxially oriented microporous membranes, biaxially oriented macroporous membranes, battery separators, flat sheet membranes, and/or liquid retention media with improved charge capacities, and/or related methods, and/or methods of manufacture, methods of use, and/or the like. In accordance with at least certain selected embodiments, the possibly preferred inventive dry process separator may be biaxially stretched and may have a preferred thickness range between 10 µm and 25 µm having improved strength, high porosity, and unexpectedly and/or surprisingly high charge capacity, such as, for example, high 10 C rate charge capacity. In addition, the possibly preferred inventive separator's or membrane's high charge capacity and high porosity may provide excellent charge rate and/or charge capacity performance in a rechargeable and/or secondary lithium battery, such as a lithium ion battery, for high power and/or high energy applications such as, by way of example only, Electric Drive Vehicles or Hybrid Electric Vehicles. In accordance with at least certain particular embodiments, the present invention is directed to improved microporous battery separators for secondary lithium batteries, improved microporous battery separators with enhanced or high charge rates and/or enhanced or high charge capacities in or for secondary lithium batteries, and/or related methods of manufacture, use, and/or the like.

BACKGROUND OF THE INVENTION

Porous polymer membranes can be made by various processes. Several processes are known and may have a significant impact on the characteristics that the resulting membrane will possess. See for example, Kesting, Robert E., Synthetic Polymeric Membranes, A structural perspective, Second Edition, John Wiley and Sons, New York, Y, (1985). Three well known processes for making porous polymer membranes include dry-stretch (also called dry process and/or the CELGARD® process), the wet process, and the particle stretch process.

The dry process comprises at least three steps: extrusion, annealing, and stretching. Pores are formed during the stretching of the extruded polymer precursor. This stretching may be unidirectional, or in the machine direction (MD). See, for example, Kesting, Ibid. pages 290-297, incorporated herein by reference. The wet process, also known as phase inversion, involves the mixing of the polymer resins with a processing oil or a plasticizer, and/or other additives, and the mixture is then extruded and the processing oil or plasticizer is removed. During the wet process the pores are formed when the processing oil is removed. See, for example Kesting, Ibid. pages 237-286, incorporated herein by reference. In the particle stretch process, polymeric raw material is mixed with a particulate, and the mixture is extruded. The pores are formed during the stretching when the interface between the polymer and the particulate fractures due to the stretching forces. See for example, U.S. Pat. Nos. 6,057,061 and 6,080,507 incorporated herein by reference.

Each of these processes is unique and distinct, each resulting in a membrane that is physically different and distinguishable from the others. Distinguishing characteristics may include the shape and size of the pores. For examples, those membranes derived from the dry process may have slit-shaped pores due to the machine direction stretching, while membranes derived from certain wet processes may have rounder pores, sometimes with a lace like appearance, due to the plasticizer. And finally particle stretch membranes may have pores that appear more oval-like. In each of these processes, the mechanical strength is characterized in terms of the tensile strength the machine direction (MD) and transverse direction (TD). U.S. Pat. No. 8,795,565 describes a stretching of a dry process membrane along both the MD and the TD axes. Membranes biaxially stretched may have improved mechanical strength, which may be indicative of the membrane's strength profile within the battery. Furthermore, it has been shown to be advantageous to seek membranes with a balanced MD strength to TD strength ratio.

Batteries used in high power and/or high energy applications, for example, those used in Electric Drive Vehicles (EDVs), may need separators that enable the battery to have a high charge rate and/or a high charge capacity for optimal high energy performance. While rechargeable lithium ion batteries have been shown to be commercially viable for at least certain such high power and/or high energy applications, improvements are constantly needed in energy storage, power, and life cycle capabilities, particularly within the realm of separators that enable batteries to have unexpectedly high charge rate and/or high charge capacity. Furthermore, there is constantly a need for improved microporous battery separators or membranes that will meet the high energy performance requirements of not only the Electric Drive Vehicle battery market and the Hybrid Vehicle battery market, but also of more complex consumer electronics systems.

SUMMARY OF THE INVENTION

In accordance with at least selected embodiments, the present invention or application may address the above needs, and/or may be directed to novel or improved battery separators, base films or membranes, batteries, cells, devices, systems, and/or vehicles, and/or methods of making and/or using such separators, films or membranes, batteries, cells, devices, systems, and/or vehicles, and/or the like. In accordance with at least certain embodiments the present invention or application is directed to biaxially oriented porous membranes, composites including biaxially oriented porous membranes, biaxially oriented microporous membranes, biaxially oriented macroporous membranes, battery separators, flat sheet membranes, and/or liquid retention media with improved charge capacities, and/or related methods, and/or methods of manufacture, methods of use, and/or the like. In accordance with at least certain selected embodiments, the possibly preferred inventive dry process separator may be biaxially stretched and may have a preferred thickness range between 10 µm and 25 µm having improved strength, high porosity, and unexpectedly and/or surprisingly high charge capacity, such as, for example, high 10 C rate charge capacity. In addition, the possibly preferred inventive separator's or membrane's high charge capacity and high porosity may provide excellent charge rate and/or charge capacity performance in a rechargeable and/or secondary lithium battery, such as a lithium ion battery, for high power and/or high energy applications such as, by way of example only, Electric Drive Vehicles or Hybrid Electric Vehicles. In accordance with at least certain particular embodiments, the present invention is directed to improved microporous battery separators for secondary lithium batteries, improved microporous battery separators with enhanced or high charge rates and/or enhanced or high charge capacities in or for secondary lithium batteries, and/or related methods of manufacture, use, and/or the like. In accordance with at least certain selected embodiments, the present invention is directed to improved microporous battery separators for primary or secondary lithium batteries, high charge and/or discharge rate batteries, high charge and/or discharge rate batteries for drones, race cars, rapid charge busses, electric vehicles, hybrid electric vehicles, and/or other vehicles or devices requiring high charge and/or discharge rate batteries, high charge and/or discharge rate primary or secondary lithium batteries, high charge and/or discharge rate primary lithium batteries and/or high charge and/or discharge rate secondary lithium batteries, and/or methods related thereto and/or combinations thereof.

In accordance with at least certain embodiments, aspects or objects, the present invention or application may address the above needs, and/or may be directed to novel or improved battery separators, base films or membranes, and/or methods of making and/or using such separators, films or membranes. In accordance with at least certain selected embodiments the present invention or application is directed to biaxially oriented porous membranes, composites including biaxially oriented porous membranes, biaxially oriented microporous membranes, biaxially oriented macroporous membranes, battery separators, flat sheet membranes, or liquid (or electrolyte) retention media with improved charge capacities, and/or related methods, and/or methods of manufacture, methods of use, and the like. The possibly preferred inventive dry process separator may be biaxially stretched and may have a membrane or separator thickness range between about 5 µm and 50 µm, a preferred thickness range between 10 µm and 25 µm, having improved strength, high porosity, and unexpectedly or surprisingly high charge capacity, such as, for example, high 10 C rate charge capacity. In addition the preferred inventive separator's or membrane's high charge rate and/or high charge capacity and high porosity may provide excellent charge rate performance in a rechargeable lithium battery for high power and/or high energy applications such as Electric Drive Vehicles or Hybrid Electric Vehicles. The present invention further relates to various methods of enhancing the C rate in a lithium secondary battery, as well as various improved batteries, such as hybrid batteries, such as batteries for hybrid electric vehicles, comprising a separator that enables such battery to have an unexpectedly or surprisingly high C rate. These and other features of the present invention are described herein.

In accordance with at least certain embodiments, aspects or objects, the present invention or application may address the above needs, and/or may be directed to novel or improved battery separators, base films or membranes, and/or methods of making and/or using such separators, films or membranes, especially for batteries used in high power and/or high energy applications, for example, those used in Electric Drive Vehicles (EDVs), and/or that need separators that enable the battery to have a high charge rate and/or a high charge capacity for optimal high energy performance, and/or in energy storage, power, and life cycle capabilities, and/or for batteries having unexpectedly high charge rate and/or high charge capacity, and/or to novel or improved microporous battery separators or membranes, coated separators or membranes, composite separators or membranes, and/or the like that may meet the high energy performance requirements of not only the Electric Drive Vehicle battery market and the Hybrid Vehicle battery market, but also of more complex consumer electronics systems, drone batteries, race car batteries, quick charge systems, quick charge busses, and/or the like.

A possibly preferred novel porous battery separator has been developed for use in a lithium ion rechargeable battery. The possibly preferred inventive separator membrane, separator, base film or membrane is a microporous, mesoporous or macroporous wet or dry process polymer single layer or multilayer or multiply membrane or separator, possibly more preferably a microporous dry process polyolefin single layer or multilayer or multiply membrane or separator, and possibly most preferably a dry process microporous polypropylene monolayer configuration. The inventive polypropylene separator can be prepared by the dry process (e.g., the CELGARD® dry process), and the separator or membrane can be uncoated, coated, treated, laminated to one or more other layers or materials (such as a glass or PP nonwoven material or layer), and/or the like.

The preferred inventive membrane with its combination of balanced MD/TD strength, high porosity and high C-rate and/or charge capacity when in use in a battery has improved cycle life performance and/or a higher level of safety in a lithium or lithium ion rechargeable battery for use in high power end use applications.

The exemplary inventive membrane, with a preferred thickness range of 10 µm to 25 µm, has a high charge rate and/or a high charge capacity and excellent discharge performance when compared to known battery separator membranes. A separator should have significant mechanical strength to endure the rigors of cell assembly as well as the rigors of continuous charge and discharge cycles throughout the lifetime of a battery. The inventive separator possibly preferably has a puncture strength over 100 gf, possibly more preferably over 200 gf, and possibly most preferably over 300 gf. In one particular example, the inventive separator has a puncture strength the ranging from 335 gf at a thickness of about 14 µm up to 400 gf at a thickness of about 20 µm. The inventive dry process microporous battery separator membrane preferably has equal or better separator charge performance and/or discharge performance and/or charge acceptance properties, and/or cycle life performance in a lithium ion secondary battery as wet process battery separator microporous membranes.

In at least selected embodiments, novel or improved battery separators, base films or membranes, batteries, systems, vehicles, and/or methods of making and/or using such separators, films or membranes, batteries, systems, and/or methods of enhancing battery or cell charge rates, charge capacity, and/or discharge rates, and/or methods of improving batteries, systems including such batteries, vehicles including such batteries and/or systems, and/or the like;

biaxially oriented porous membranes, composites including biaxially oriented porous membranes, biaxially oriented microporous membranes, biaxially oriented macroporous membranes, battery separators with improved charge capacities and the related methods and methods of manufacture, methods of use, and the like; flat sheet membranes, liquid retention media; dry process separators; biaxially stretched separators; dry process biaxially stretched separators having a thickness range between about 5 µm and 50 µm, preferably between about 10 µm and 25 µm, having improved strength, high porosity, and unexpectedly and/or surprisingly high charge capacity, such as, for example, high 10 C rate charge capacity; separators or membranes with high charge capacity and high porosity, excellent charge rate and/or charge capacity performance in a rechargeable and/or secondary lithium battery, such as a lithium ion battery, for high power and/or high energy applications, cells, devices, systems, and/or vehicles, and/or the like; single or multiple ply or layer separators, monolayer separators, trilayer separators, composite separators, laminated separators, co-extruded separators, coated separators, 1 C or higher separators, at least 1 C separators, batteries, cells, systems, devices, vehicles, and/or the like; improved microporous battery separators for secondary lithium batteries, improved microporous battery separators with enhanced or high charge (C) rates, discharge (C) rates, and/or enhanced or high charge capacities in or for secondary lithium batteries, and/or related methods of manufacture, use, and/or the like, and/or combinations thereof are disclosed or provided.

Certain embodiments may be generally related to U.S. Pat. No. 8,795,565 B2 issued Aug. 5, 2014 and/or to U.S. published application 2011/0223486 A1 published Sep. 15, 2011, both of which are hereby fully incorporated by reference herein.

DETAILED DESCRIPTION OF THE INVENTION

An exemplary novel or improved microporous battery separator has been developed for use in a lithium battery, such as a lithium ion rechargeable battery. In selected embodiments, the possibly preferred inventive separator membrane is a dry process polypropylene monolayer porous battery separator. In certain particular embodiments, the separator is manufactured using a homopolymer polypropylene, in some instances, with a melt flow index of 0.7-0.8.

The instant membrane is preferably made by the dry-stretch process (also known as the CELGARD® process). The dry-stretch process refers to a process where formation results from stretching a nonporous precursor. See, Kesting, R., Synthetic Polymeric Membranes, A structural perspective, Second Edition, John Wiley & Sons, New York, N.Y., (1985), pages 290-297, incorporated herein by reference. The dry-stretch process is distinguished from the wet process and particle stretch process, as discussed above.

The instant membrane may be distinguished from prior biaxially stretched dry-stretched membranes as the inventive membrane exhibits significant improvements in several ways, including but not limited to: exhibiting excellent high c-rate discharge performance, high c-rate charge performance, and/or demonstrating higher capacities and/or longer cycle life at higher c-rates.

Figure 1:
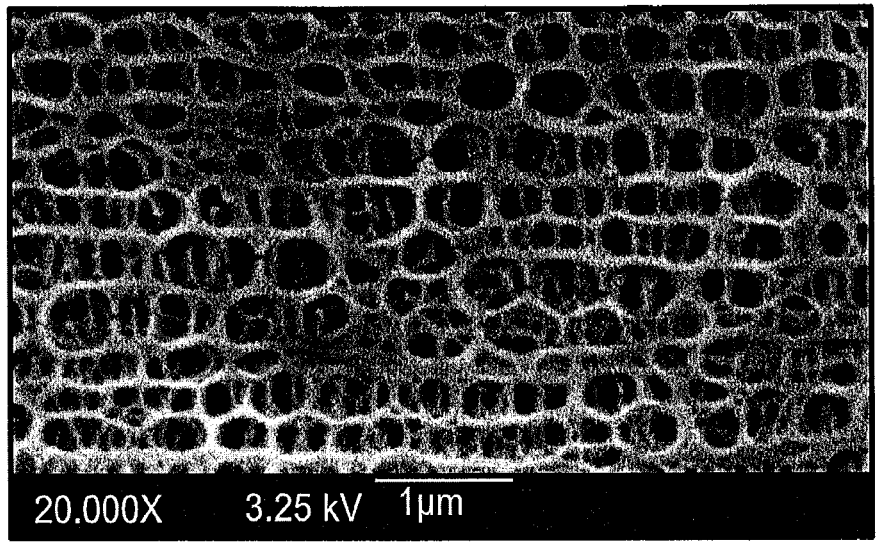
FIG. 1 is an SEM (scanning electron micrograph) surface view of a separator according to the biaxial stretch type process of Example 1 (EX1) at a magnification of 20,000×.
Figure 2:
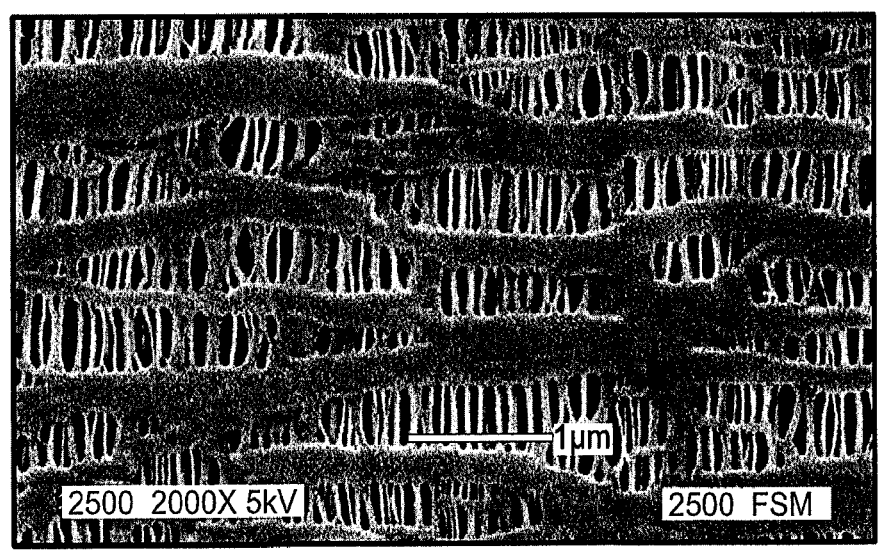
FIG. 2 is an SEM surface view of a separator according to Comparative Example 1 (CE1) at a magnification of 20,000×.
Figure 3:
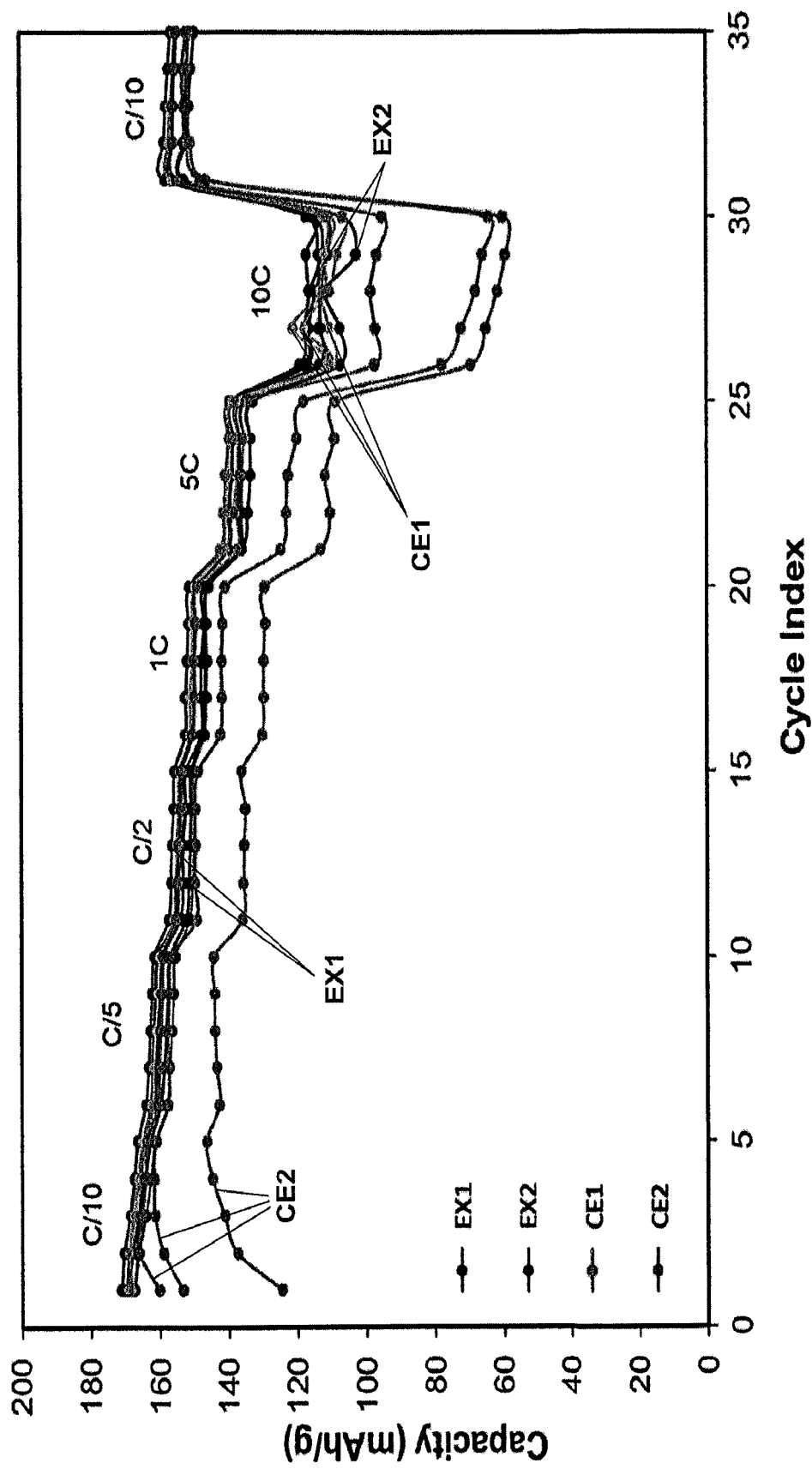
FIG. 3 demonstrates better discharge performance of EX1 and EX2 when compared to CE1 and CE2. CE1 is a microporous, dry process, 25 um thick, monolayer polypropylene (PP) membrane that is MD stretched only (no TD stretch). CE2 is a microporous, dry process, 16 um thick, monolayer polypropylene (PP) membrane that is MD stretched only (no TD stretch).

Regarding the discharge performance, the inventive membrane in at least one embodiment shows high rate discharge performance (see FIG. 3) that is comparable to or better than Comparative Example 1 and Comparative Example 2.

Figure 4:
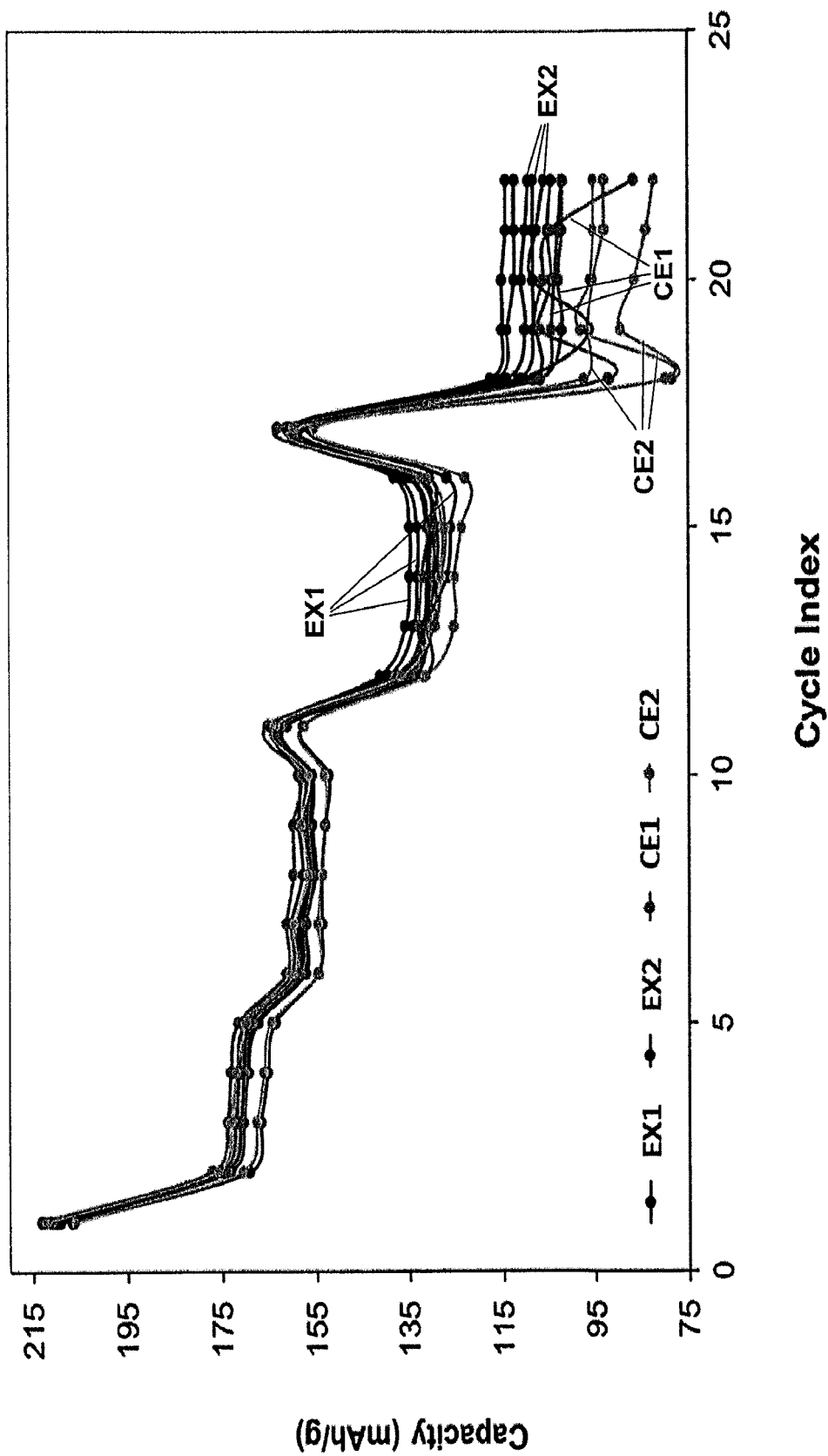
FIG. 4 demonstrates better C-rate performance of EX1 and EX2 when compared to CE1 and CE2.
Figure 5:
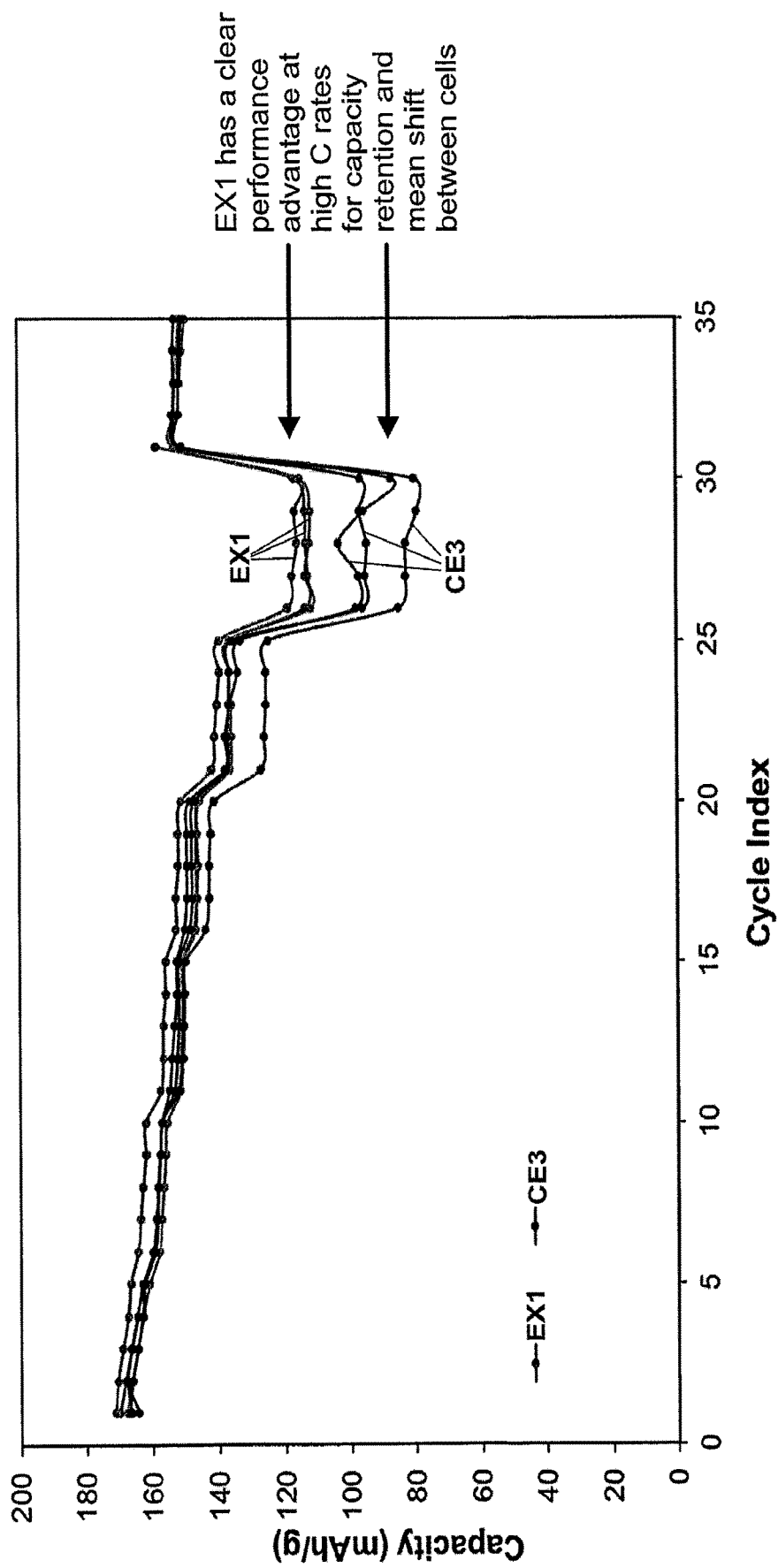
FIG. 5 demonstrates better C-rate performance of EX1 compared to CE3. CE3 is a microporous, dry process, 16 um thick, monolayer polypropylene (PP) membrane that is MD stretched only (no TD stretch).

Regarding having higher capacities at higher c-rates (see FIG. 4) the inventive membrane in at least one embodiment demonstrates high capacity at both 5 C and 10 C, with 10 C showing a significant, unexpected, and surprising improvement when compared to Comparative Examples 1 and 2.

In certain particular embodiments, the instant membrane may be further characterized as follows: an average pore size in the range of 0.090 to 0.099 microns (µm); a porosity in the range of 50-80%; and/or a transverse direction tensile strength of greater than 500 Kg/cm2. The foregoing values are exemplary values and are not intended to be limiting, and accordingly should be viewed as merely representative of the particular instant membrane embodiment.

The instant membrane may be a single-ply or multi-ply membrane. Regarding the multi-ply membrane, the instant membrane may be one ply of the multi-ply membrane or the instant membrane may be all of the plies of the multi-ply membrane. If the instant membrane is less than all of the plies of the multi-ply membrane, the multi-ply membrane may be made via a lamination process. If the instant membrane is all plies of the multi-ply membrane, the multi-ply membrane additionally may be made via a co-extrusion process. Further, multi-ply membranes may be made of plies of the same materials or of differing materials.

The instant membrane is preferably made by a dry-stretch process where the precursor membrane is biaxially stretched (i.e., not only stretched in the machine direction, but also in the transverse machine direction). This process will be discussed in greater detail below. The invention is not limited to the dry process or Celgard dry process.

In general, the process for making the foregoing membrane includes the steps of extruding one or more polymers to form a nonporous precursor, and then biaxially stretching the nonporous precursor. Optionally, the nonporous precursor may be annealed prior to stretching. In one embodiment, the biaxial stretching includes a machine direction stretch and a transverse direction with a simultaneous controlled machine direction relax. The machine direction stretch and the transverse direction stretch may be simultaneous or sequential. In one embodiment, the machine direction stretch is followed by the transverse direction stretch with the simultaneous machine direction relax. This process is discussed in greater detail below.

Extrusion is generally according to a dry-stretch process. The extruder may have a slot die (for a flat precursor) or an annular die (for a parison precursor). In the case of the latter, an inflated parison technique may be employed (e.g., a blow up technique with a specific blow up ratio (BUR)). However, the birefringence of the nonporous precursor does not have to be as high as in the conventional dry-stretch process. For example, in the conventional dry-stretch process to produce a membrane with a >35% porosity from a polypropylene resin, the birefringence of the precursor would be >0.0130; while with the instant process, the birefringence of the PP precursor could be as low as 0.0100. In another example, to produce a membrane with a >35% porosity from a polyethylene resin using a more conventional dry-stretch process, the birefringence of the precursor would be >0.0280; while with the instant process, the birefringence of the PE precursor could be as low as 0.0240.

Annealing (optional) may be carried out, in one embodiment, at temperatures between $T_m-80°$ C. and $T_m-10°$ C. (where $T_m$ is the melt temperature of the polymer); and in another embodiment, at temperatures between $T_m-50°$ C. and $T_m-15°$ C. Some materials, e.g., those with high crystallinity after extrusion, such as polybutene, may require no annealing.

Machine direction stretch may be conducted as a cold stretch or a hot stretch or both, and as a single step or multiple steps. In one embodiment, cold stretching may be carried out at $<T_m-50°$ C., and in another embodiment, at $<T_m-80°$ C. In one embodiment, hot stretching may be carried out at $<T_m-10°$ C. In one embodiment, total machine direction stretching may be in the range of 50-500%, and in another embodiment, in the range of 100-300%. During machine direction stretch, the precursor may shrink in the transverse direction (conventional).

Transverse direction stretching includes a simultaneous controlled machine direction relax. This means that as the precursor is stretched in the transverse direction, the precursor is simultaneously allowed to contract (i.e., relax), in a controlled manner, in the machine direction. The transverse direction stretching may be conducted as a cold step, or a hot step, or a combination of both. In one embodiment, total transverse direction stretching may be in the range of 100-1200%, and in another embodiment, in the range of 200-900%. In one embodiment, the controlled machine direction relax may range from 5-80%, and in another embodiment, in the range of 15-65%. In one embodiment, transverse stretching may be carried out in multiple steps. During transverse direction stretching, the precursor may or may not be allowed to shrink in the machine direction. In an embodiment of a multi-step transverse direction stretching, the first transverse direction step may include a transverse stretch with the controlled machine relax, followed by simultaneous transverse and machine direction stretching, and followed by transverse direction relax and no machine direction stretch or relax.

Optionally, the precursor, after machine direction and transverse direction stretching may be subjected to a heat setting, as is well known.

The foregoing membrane and process are further illustrated in the following non-limiting examples.

EXAMPLES

Example 1

Polypropylene (PP) resin is extruded using a 2.5 inch extruder. The extruder melt temperature is about 221° C. Polymer melt is fed to a circular die. The die temperature is set at about 220° C., and the polymer melt is cooled by blowing air. Extruded precursor has a thickness in a range of about 1-1.5 mils, in some cases, 1.2-1.4 mils, and in some cases about 27 μm. The extruded film was then annealed at about 150° C. for about 2 minutes. The annealed film is then cold stretched to about 20% at room temperature, and then hot stretched to about 228% and relaxed to about 32% at a temperature in the range of 150-160° C. The MD stretched film is then transverse direction (TD) stretched 450% at a TD stretch temperature in the range of about 140-152 degrees C. with a MD relax of 50%. The finished film has a thickness of 15 microns, and porosity of 74%. TD tensile strength of finished film is 529 Kg/cm2.

Example 2

Polypropylene (PP) resin is extruded using a 2.5 inch extruder. The extruder melt temperature is about 221° C. Polymer melt is fed to a circular die. The die temperature is set at about 220° C., and the polymer melt is cooled by blowing air. Extruded precursor has a thickness in a range of about 1-1.5 mils, in some cases, 1.2-1.4 mils, and in some cases about 27 μm. The extruded film was then annealed at about 150° C. for about 2 minutes. The annealed film is then cold stretched to about 20% at room temperature, and then hot stretched to about 228% and relaxed to about 32% at a temperature in the range of 160-170° C. The MD stretched film is then transverse direction (TD) stretched 450% at a TD stretch temperature in the range of about 150-160 degrees C. with a MD relax of 50%. The finished film has a thickness of 20 microns, and porosity of 69%. TD tensile strength of finished film is 650 Kg/cm2.

Features of the membranes formed according to Examples 1 and 2 as well as features of membranes used as Comparative Example 1 are shown below in Table 1.

TABLE 1

| Properties | CE 1 | EX2 | EX1 |
| --- | --- | --- | --- |
| Thickness (μm) | 25 | 20 | 15 |
| Porosity, % | 55% | 69% | 74% |
| Gurley (JIS), seconds | 200 | 65 | 28 |
| TD Shrinkage @ 90 C./1 hr | 0 | 0.1 | 0.2 |
| MD Shrinkage @ 90 C./1 hr | 3-5 | 4.5 | 4.6 |
| Puncture Strength, grams | 335 | 400 | 220 |
| MD Tensile (kg/cm2) | 1055 | 950 | 788 |
| TD Tensile (kg/cm2) | 135 | 650 | 529 |
| ER (ohm-cm2) | 1.35 | 0.7 | 0.5 |
| DB, Volts | 1800 | 1600 | 900 |
| Aquapore Size (um) | 0.060 | 0.090 | 0.096 |
| Mean Flow Pore Size (um) | 0.036 | 0.050 | 0.50 |

The separators described above as Examples 1 and 2 and Comparative Examples 1 and 2 were then tested for charge capacity and C rate, and the results are shown in Table 2 below:

TABLE 2

| | C-Rate | |
| --- | --- | --- |
| | 1 C | 10 C |
| CE1 | 158.38 mAh/g | 102.34 mAh/g |
| CE2 | 156.85 mAh/g | 90.80 mAh/g |
| EX1 | 156.91 mAh/g | 111.63 mAh/g |
| EX2 | 156.79 mAh/g | 108.64 mAh/g |

Test Methods

Thickness

Thickness is measured using the Emveco Microgage 210-A precision micrometer thickness tester according to test procedure ASTM D374. Thickness values are reported in units of micrometers, µm.

Puncture Strength

Test samples are first pre-conditioned to 73.4 deg C. and a relative humidity of 50% for a minimum of 20 minutes. An Instron Model 4442 is used to measure puncture strength of test sample. Thirty measurements are made across the diagonal direction of a 1¼" 40" continuous sample specimen and averaged. The needle has a 0.5 mm radius. The rate of descent is 25 mm/min. The film is held tight in a clamping device which utilizes an O-ring to securely hold the test sample in place. The diameter of this secured area is 25 mm. The displacement (in mm) of the film that was pierced by the needle is recorded against the resistance force (in gram force) developed by the tested film. The maximum resistance force is the puncture strength in units of gram force (gf). A load-versus-displacement plot is produced by this test method.

Pore Size

Pore size is measured using the Aquapore available through Porous Materials, Inc. (PMI). Pore size is expressed in µm.

Porosity

The porosity of a microporous film sample is measured using ASTM method D-2873 and is defined as the percent void spaces in a microporous membrane.

TD and MD Tensile Strength

The tensile strength along the MD and TD is measured using Instron Model 4201 according to ASTM D-882 method.

Thermal Shrinkage

Shrinkage testing is measured by placing a 10 cm×10 cm membrane sample in a manila folder which is then suspended in an oven using a clip. Shrinkage was measured using calipers in the MD and TD direction before and after a test sample were was placed in the oven at 105° C. for 1 hour. Shrinkage was also measured using calipers in the MD and TD direction before and after a second test sample were was placed in the oven at 120° C. for 1 hour. Shrinkage is expressed as a % MD shrinkage and % TD shrinkage using modified ASTM 2732-96.

Hot Electrical Resistance (ER)

Hot Electrical Resistance is a measure of resistance of a separator film under 50 lb pressure while the temperature is linearly increased at a rate of 60° C./minute. A ⅜" diameter piece of separator is saturated with electrolyte and sandwiched between two electrode discs made of Al or Cu. The rise in resistance is measured as Impedance and corresponds to a collapse in pore structure due to melting or "shutdown" of the microporous separator membrane. When a microporous separator membrane has sustained high level of electrical resistance at elevated temperatures, this is indicative that the separator membrane may prevent electrode shorting in a battery.

Cycling

All cycling was done in constant current (CC) mode. Cathode used is 622 NMC. Anode used is graphite. Electrolyte used 1 M $LiPF_6$ salt in 3:7 v:v EC:EMC solvent. Voltage window is 3.0-4.3 V. Cycles 1-5 have a charge rate and discharge rate of C/10. Cycles 6-10 have a charge rate and discharge rate of C/5. Cycles 11-15 have a charge rate of C/5 and a discharge rate of C/2. Cycles 16-20 have a charge rate of C/5 and a discharge rate of 1 C (charge/discharge rate capacity; 1 C is a rate of full charge or discharge in 60 minutes). Cycles 21-25 have a charge rate of C/5 and a discharge rate of 5 C. Cycles 26-30 have a charge rate of C/5 and a discharge rate of 10 C. Cycles 31-35 have a charge rate and discharge rate of C/10.

Other examples include quick charge and/or discharge, primary or secondary batteries including drone batteries, race car batteries, bus batteries, electric car batteries, hybrid vehicle batteries, and/or the like. Certain batteries are one time use primary quick charge and/or discharge lithium batteries. Other batteries are multi-use secondary quick charge and/or discharge lithium batteries. Preferred batteries may include quick charge lithium batteries, quick discharge lithium batteries, and/or quick charge and quick discharge lithium batteries.

In accordance with at least selected embodiments, aspects and/or objects, the present invention or application is directed to or provides novel or improved battery separators, base films or membranes, batteries, systems, vehicles, and/or methods of making and/or using such separators, films or membranes, batteries, systems, and/or methods of enhancing battery or cell charge rates, charge capacity, and/or discharge rates, and/or methods of improving batteries, systems including such batteries, vehicles including such batteries and/or systems, and/or the like; biaxially oriented porous membranes, composites including biaxially oriented porous membranes, biaxially oriented microporous membranes, biaxially oriented macroporous membranes, battery separators with improved charge capacities and the related methods and methods of manufacture, methods of use, and the like; filtration media, humidity control media, flat sheet membranes, liquid retention media; dry process separators; biaxially stretched separators; dry process biaxially stretched separators having a thickness range between about 5 µm and 50 µm, preferably between about 10 µm and 25 µm, having improved strength, high porosity, and unexpectedly and/or surprisingly high charge capacity, such as, for example, high 10 C rate charge capacity; separators or membranes with high charge capacity and high porosity, excellent charge rate and/or charge capacity performance in a rechargeable and/or secondary lithium battery, such as a lithium ion battery, for high power and/or high energy applications such as, by way of example only, Electric Drive Vehicles (EDVs) or Hybrid Electric Vehicles (HEVs), electrified or electric assist vehicles, regenerative braking systems, idle start/stop systems (ISS), start/stop systems, Electric Vehicles (EVs), battery electric vehicles (BEVs), Plug In Hybrid Electric Vehicles (PHEVs), high charge or C rate electric vehicle batteries, high charge or C rate and high discharge or D rate electric vehicle batteries, e-bike batteries, e-cycle batteries, hybrid or multiple wheel drive electric vehicle batteries, consumer electronics, mobile devices, smart phones, laptops, tablets, polymer batteries, power cells, portable tool batteries, cordless tool batteries, cordless tools, and/or the like; single or multiple ply or layer separators, monolayer separators, trilayer separators, composite separators, laminated separators, co-extruded separators, coated separators, 1 C or higher separators (battery or cell fully charge or discharge in 60 minutes or less), 2 C or higher separators (battery or cell fully charge or discharge in 30 minutes or less), 10 C or higher separators (battery or cell fully charge or discharge in 6 minutes or less), 20 C or higher separators (battery or cell fully charge or discharge in 3 minutes or less), at least 1 C separators, at least 2 C separators, at least 10 C separators, at least 20 C separators, over 20 C separators, batteries, systems, devices, vehicles, and/or the like; improved microporous battery separators for secondary lithium batteries, improved microporous battery separators with enhanced or high charge (C) rates, discharge (C) rates, and/or enhanced or high charge capacities in or for secondary lithium batteries, and/or related methods of manufacture, use, and/or the like, and/or combinations thereof.

In accordance with at least certain embodiments, the present invention or application is directed to novel or improved battery separators, base films or membranes, batteries, cells, devices, systems, vehicles, and/or methods of making and/or using such separators, films or membranes, batteries, cells, devices, systems, vehicles, and/or the like. In accordance with at least certain selected embodiments the present invention or application is directed to biaxially oriented porous membranes, composites including biaxially oriented porous membranes, biaxially oriented microporous membranes, biaxially oriented macroporous membranes, battery separators, flat sheet membranes, or liquid retention media with improved charge capacities and the related methods and methods of manufacture, methods of use, and/or the like. The possibly preferred inventive dry process separator may be biaxially stretched and may have a thickness range between 10 µm and 25 µm having improved strength, high porosity, and unexpectedly and/or surprisingly high charge capacity, such as, for example, high 10 C rate charge capacity. In addition the preferred inventive separator's or membrane's high charge capacity and high porosity provide excellent charge rate and/or charge capacity performance in a rechargeable and/or secondary lithium battery, such as a lithium ion battery, for high power and/or high energy applications such as, by way of example only, Electric Drive Vehicles or Hybrid Electric Vehicles. In accordance with at least certain selected embodiments, the present invention is directed to improved microporous battery separators for secondary lithium batteries, improved microporous battery separators with enhanced or high charge rates and/or enhanced or high charge capacities in or for secondary lithium batteries, and/or related methods of manufacture, use, and/or the like.

In accordance with at least certain selected embodiments, the present invention or application is directed to novel or improved battery separators, base films or membranes, batteries, systems, vehicles, and/or methods of making and/or using such separators, films or membranes, batteries, systems, and/or methods of enhancing battery or cell charge rates, charge capacity, and/or discharge rates, and/or methods of improving batteries, systems including such batteries, vehicles including such batteries and/or systems, and/or the like; biaxially oriented porous membranes, composites including biaxially oriented porous membranes, biaxially oriented microporous membranes, biaxially oriented macroporous membranes, battery separators with improved charge capacities and the related methods and methods of manufacture, methods of use, and the like; filtration media, humidity control media, flat sheet membranes, liquid retention media; dry process separators; biaxially stretched separators; dry process biaxially stretched separators having a thickness range between about 5 µm and 50 µm, preferably between about 10 µm and 25 µm, having improved strength, high porosity, and unexpectedly and/or surprisingly high charge capacity, such as, for example, high 10 C rate charge capacity; separators or membranes with high charge capacity and high porosity, excellent charge rate and/or charge capacity performance in a rechargeable and/or secondary lithium battery, such as a lithium ion battery, for high power and/or high energy applications, cells, devices, systems, and/or vehicles, and/or the like; single or multiple ply or layer separators, monolayer separators, trilayer separators, composite separators, laminated separators, co-extruded separators, coated separators, 1 C or higher separators (separator enables the battery or cell to fully charge or discharge in 60 minutes or less), at least 1 C separators, batteries, systems, devices, vehicles, and/or the like; improved microporous battery separators for secondary lithium batteries, improved microporous battery separators with enhanced or high charge (C) rates, discharge (C) rates, and/or enhanced or high charge capacities in or for secondary lithium batteries, and/or related methods of manufacture, use, and/or the like, and/or combinations thereof.

The inventive separators of at least certain embodiments of the present invention may be especially well suited or adapted for use in regenerative braking system batteries or cells in a regenerative braking system or equipped vehicle such as an electric, hybrid or electrified vehicle. Regenerative braking slows a vehicle by converting kinetic energy into electrical energy that can be stored in a battery or cell. In addition to improving the overall efficiency of the vehicle, the electric drive of the vehicle, or charging of the batteries or cells, regenerative braking can extend the life of the braking system as its parts do not heat and wear as quickly. The inventive separators of the present invention may likewise be especially well suited or adapted for use in high power and/or high energy battery applications such as, and by way of example only, Idle Start Stop Vehicles, Electric Drive Vehicles, Hybrid Electric Vehicles, power tools, cordless tools, Energy Storage Systems, UPS, backup power systems, combination lead acid battery and lithium battery systems, combination lithium battery and capacitor systems, and/or the like.

In accordance with at least selected porous material or porous membrane embodiments of the present invention, the pores (openings) may have the following pore aspect ratios (based on physical dimensions of the pore opening in the machine direction (MD)(length), and transverse machine direction (TD)(width) by measuring, for example, one or more of the pores (preferably several of the pores to ascertain an average) in SEMs of the surface, top or front (A side) of selected membranes or composites, for example, monolayer, bi-layer or tri-layer membranes:

Typical:
MD/TD aspect ratio in range of 0.75 to 1.50
Preferred:
MD/TD aspect ratio in range of 0.75 to 1.25
Most Preferred:
MD/TD aspect ratio in range of 0.85 to 1.25

In accordance with at least selected porous material or porous membrane embodiments of the present invention, if the MD/TD pore aspect ratio were 1.0, then a three-dimensional or 3D pore sphericity factor or ratio (MD/TD/ND) range could be: 1.0 to 8.0 or more; possibly preferred 1.0 to 2.5; and, most possibly preferred 1.0 to 2.0 or less (based on physical dimensions of the pore openings in the machine direction (MD)(length), transverse machine direction (TD) (width) and thickness direction or cross section (ND)(thickness); for example, measuring the MD and TD of one or more pores (preferably several pores to ascertain an average) in SEMs of the surface, top or front (A side), or the surface, bottom or back (B side), and measuring the ND of one or more pores (preferably several pores to ascertain an average) in SEMs of the cross-section, depth, or height (C side)(either length or width cross-section or both)(the ND dimension may be of a different pore than the MD and TD dimension as it may be difficult to measure the ND, MD and TD dimension of the same pore).

In accordance with at least selected porous material or porous membrane embodiments of the present invention, the pores (openings) may have the following pore aspect ratios (based on physical dimensions of the pore opening in the machine direction (MD)(length), and transverse machine direction (TD)(width) based on measuring the pores in SEMs of the top or front (A side) of selected mono-layer and tri-layer membranes: Typical numbers for aspect ratio range of Machine direction MD (length) and Transverse direction TD (width): MD/TD aspect ratio in range of 0.75 to 1.50

In accordance with at least selected porous material or porous membrane embodiments of the present invention, the pores (openings) may have the following three dimensional or 3D pore sphericity factors or ratios (based on physical dimensions of the pore openings in the machine direction (MD)(length), transverse machine direction (TD)(width) and thickness direction or cross section (ND)(thickness); for example, measuring one or more pores (preferably several pores to ascertain an average) in SEMs of the surface, top or front (A side), the surface, bottom or back (B side), and the cross-section, depth, or height (C side)(either length or width cross-section or both)(the ND dimension may be of a different pore than the MD and TD dimension as it may be difficult to measure the ND, MD and TD dimension of the same pore) of selected membranes, layers or composites, for example, of selected mono-layer and tri-layer membranes:

For example:
Typical:
MD/TD aspect ratio in range of 0.75 to 1.50
MD/ND dimension ratio in range of 0.50 to 7.50
TD/ND dimension ratio in range of 0.50 to 5.00
Preferred:
MD/TD aspect ratio in range of 0.75 to 1.25
MD/ND dimension ratio in range of 1.0 to 2.5
TD/ND dimension ratio in range of 1.0 to 2.5
Most Preferred:
MD/TD aspect ratio in range of 0.85 to 1.25
MD/ND dimension ratio in range of 1.0 to 2.0
TD/ND dimension ratio in range of 1.0 to 2.0

In accordance with at least selected porous material or porous membrane embodiments of the present invention, the pores (openings) may have the following pore sphericity factors or ratios (based on physical dimensions of the pore opening in the machine direction (MD)(length), transverse machine direction (TD)(width) and thickness direction or cross section (ND)(thickness) based on measuring the pores in SEMs of the top or front (A side) and the length and with cross-sections (C side) of selected mono-layer and tri-layer membranes:

Typical numbers for sphericity factor or ratio range of
  Machine direction MD (length), Transverse direction TD (width), and
  Thickness direction ND (vertical height):
MD/TD aspect ratio in range of 0.75 to 1.50
MD/ND dimension ratio in range of 0.50 to 7.50
TD/ND dimension ratio in range of 0.50 to 5.00

In accordance with at least selected embodiments of the present invention, a microporous membrane is made by a dry-stretch process and has substantially round shaped pores and a ratio of machine direction tensile strength to transverse direction tensile strength in the range of 0.5 to 6.0, preferably 0.5 to 5.0. The method of making the foregoing microporous membrane includes the steps of: extruding a polymer into a nonporous precursor, and biaxially stretching the nonporous precursor, the biaxial stretching including a machine direction stretching and a transverse direction stretching, the transverse direction stretching including a simultaneous controlled machine direction relax.

In accordance with at least selected embodiments of the present invention, a porous membrane is made by a modified dry-stretch process and has substantially round shaped pores, a ratio of machine direction tensile strength to transverse direction tensile strength in the range of 0.5 to 6.0, and has low Gurley and/or low ER as compared to prior dry-stretch membranes, has larger and more uniform mean flow pore diameters as compared to prior dry-stretch membranes, or both low Gurley and larger and more uniform mean flow pore diameters.

In accordance with at least selected porous material or porous membrane embodiments of the present invention, the pores (openings) may have the following pore aspect ratios (based on physical dimensions of the pore opening in the machine direction (MD)(length), and transverse machine direction (TD)(width) by measuring, for example, one or more of the pores (preferably several of the pores to ascertain an average) in SEMs of the surface, top or front (A side) of selected membranes or composites, for example, mono-layer, bi-layer or tri-layer membranes:
  Typical:
  MD/TD aspect ratio in range of 0.75 to 1.50
  Preferred:
  MD/TD aspect ratio in range of 0.75 to 1.25
  Most Preferred:
  MD/TD aspect ratio in range of 0.85 to 1.25

In accordance with at least selected porous material or porous membrane embodiments of the present invention, if the MD/TD pore aspect ratio were 1.0, then a three-dimensional or 3D pore sphericity factor or ratio (MD/TD/ND) range could be: 1.0 to 8.0 or more; possibly preferred 1.0 to 2.5; and, most possibly preferred 1.0 to 2.0 or less (based on physical dimensions of the pore openings in the machine direction (MD)(length), transverse machine direction (TD) (width) and thickness direction or cross section (ND)(thickness); for example, measuring the MD and TD of one or more pores (preferably several pores to ascertain an average) in SEMs of the surface, top or front (A side), or the surface, bottom or back (B side), and measuring the ND of one or more pores (preferably several pores to ascertain an average) in SEMs of the cross-section, depth, or height (C side)(either length or width cross-section or both)(the ND dimension may be of a different pore than the MD and TD dimension as it may be difficult to measure the ND, MD and TD dimension of the same pore).

In accordance with at least selected porous material or porous membrane embodiments of the present invention, the three-dimensional or 3D MD/TD/ND pore sphericity factor or ratio range could be: 0.25 to 8.0 or more; possibly preferred 0.50 to 4.0; and, most possibly preferred 1.0 to 2.0 or less.

In accordance with at least selected porous material or porous membrane embodiments of the present invention, the pores (openings) may have the following pore aspect ratios (based on physical dimensions of the pore opening in the machine direction (MD)(length), and transverse machine direction (TD)(width) based on measuring the pores in SEMs of the top or front (A side) of selected mono-layer and tri-layer membranes: Here are the typical numbers for aspect ratio range of Machine direction MD (length) and Transverse direction TD (width): MD/TD aspect ratio in range of 0.75 to 1.50.

In accordance with at least selected porous material or porous membrane embodiments of the present invention, the pores (openings) may have the following three dimensional or 3D pore sphericity factors or ratios (based on physical dimensions of the pore openings in the machine direction (MD)(length), transverse machine direction (TD)(width) and thickness direction or cross section (ND)(thickness); for example, measuring one or more pores (preferably several pores to ascertain an average) in SEMs of the surface, top or front (A side), the surface, bottom or back (B side), and the cross-section, depth, or height (C side)(either length or width cross-section or both)(the ND dimension may be of a different pore than the MD and TD dimension as it may be difficult to measure the ND, MD and TD dimension of the same pore) of selected membranes, layers or composites, for example, of selected mono-layer and tri-layer membranes:

For example:
Typical:
MD/TD aspect ratio in range of 0.75 to 1.50
MD/ND dimension ratio in range of 0.50 to 7.50
TD/ND dimension ratio in range of 0.50 to 5.00
Preferred:
MD/TD aspect ratio in range of 0.75 to 1.25
MD/ND dimension ratio in range of 1.0 to 2.5
TD/ND dimension ratio in range of 1.0 to 2.5
Most Preferred:
MD/TD aspect ratio in range of 0.85 to 1.25
MD/ND dimension ratio in range of 1.0 to 2.0
TD/ND dimension ratio in range of 1.0 to 2.0

In accordance with at least selected porous material or porous membrane embodiments of the present invention, the pores (openings) may have the following pore sphericity factors or ratios (based on physical dimensions of the pore opening in the machine direction (MD)(length), transverse machine direction (TD)(width) and thickness direction or cross section (ND)(thickness) based on measuring the pores in SEMs of the top or front (A side) and the length and with cross-sections (C side) of selected mono-layer and tri-layer membranes:

Here are the typical numbers for sphericity factor or ratio range of Machine direction MD (length), Transverse direction TD (width), and Thickness direction ND (vertical height):
MD/TD aspect ratio in range of 0.75 to 1.50
MD/ND dimension ratio in range of 0.50 to 7.50
TD/ND dimension ratio in range of 0.50 to 5.00

In accordance with at least selected embodiments of the present invention, a microporous membrane is made by a dry-stretch process and has substantially round shaped pores and a ratio of machine direction tensile strength to transverse direction tensile strength in the range of 0.5 to 6.0, preferably 0.5 to 5.0. The method of making the foregoing microporous membrane includes the steps of: extruding a polymer into a nonporous precursor, and biaxially stretching the nonporous precursor, the biaxial stretching including a machine direction stretching and a transverse direction stretching, the transverse direction stretching including a simultaneous controlled machine direction relax.

In accordance with at least selected embodiments, the present invention or application may address the above needs, and/or may be directed to novel or improved battery separators, base films or membranes, batteries, cells, devices, systems, and/or vehicles, and/or methods of making and/or using such separators, films or membranes, batteries, cells, devices, systems, and/or vehicles, and/or the like. In accordance with at least certain embodiments the present invention or application is directed to biaxially oriented porous membranes, composites including biaxially oriented porous membranes, biaxially oriented microporous membranes, biaxially oriented macroporous membranes, battery separators, flat sheet membranes, and/or liquid retention media with improved charge capacities, and/or related methods, and/or methods of manufacture, methods of use, and/or the like. In accordance with at least certain selected embodiments, the possibly preferred inventive dry process separator may be biaxially stretched and may have a preferred thickness range between 10 µm and 25 µm having improved strength, high porosity, and unexpectedly and/or surprisingly high charge capacity, such as, for example, high 10 C rate charge capacity. In addition, the possibly preferred inventive separator's or membrane's high charge capacity and high porosity may provide excellent charge rate and/or charge capacity performance in a rechargeable and/or secondary lithium battery, such as a lithium ion battery, for high power and/or high energy applications such as, by way of example only, Electric Drive Vehicles or Hybrid Electric Vehicles. In accordance with at least certain particular embodiments, the present invention is directed to improved microporous battery separators for secondary lithium batteries, improved microporous battery separators with enhanced or high charge rates and/or enhanced or high charge capacities in or for secondary lithium batteries, and/or related methods of manufacture, use, and/or the like. In accordance with at least certain selected embodiments, the present invention is directed to improved microporous battery separators for primary or secondary lithium batteries, high charge and/or discharge rate batteries, high charge and/or discharge rate batteries for drones, race cars, rapid charge busses, electric vehicles, hybrid electric vehicles, and/or other vehicles or devices requiring high charge and/or discharge rate batteries, high charge and/or discharge rate primary or secondary lithium batteries, high charge and/or discharge rate primary lithium batteries and/or high charge and/or discharge rate secondary lithium batteries, and/or methods related thereto and/or combinations thereof.

Novel or improved separators, battery separators, lithium battery separators, batteries, cells, and/or methods of manufacture and/or use of such separators, battery separators, lithium battery separators, cells, and/or batteries; novel or improved battery separators for lithium ion primary or secondary batteries; novel or improved batteries or cells; novel or improved vehicles or devices; methods, systems and battery separators for enhancing battery charge rate, discharge rate, cycle life, and/or the like; and/or combinations thereof as shown or described herein.

Preferably there are provided, novel or improved battery separators, base films or membranes, batteries, cells, devices, systems, vehicles, and/or methods of making and/or using such separators, films or membranes, batteries, cells, devices, systems, vehicles, and/or methods of enhancing battery or cell charge rates, charge capacity, and/or discharge rates, and/or methods of improving batteries, systems including such batteries, vehicles including such batteries and/or systems, and/or the like; biaxially oriented porous membranes, composites including biaxially oriented porous membranes, biaxially oriented microporous membranes, biaxially oriented macroporous membranes, battery separators with improved charge capacities and the related methods and methods of manufacture, methods of use, and the like; flat sheet membranes, liquid retention media; dry process separators; biaxially stretched separators; dry process biaxially stretched separators preferably having a thickness range between about 5 µm and 50 µm, improved strength, high porosity, and unexpectedly and/or surprisingly high charge capacity, such as, for example, high 10 C rate charge capacity; separators or membranes with high charge capacity and high porosity, excellent charge rate and/or charge capacity performance in a rechargeable and/or secondary lithium battery, such as a lithium ion battery, for high power and/or high energy applications, cells, devices, systems, and/or vehicles, and/or the like; single or multiple ply or layer separators, monolayer separators, trilayer separators, composite separators, laminated separators, co-extruded separators, coated separators, 1 C or higher separators, at least 1 C separators, batteries, cells, systems, devices, vehicles, and/or the like; improved microporous battery separators for secondary lithium batteries, improved microporous battery separators with enhanced or high charge (C) rates, discharge (C) rates, and/or enhanced or high charge capacities in or for secondary lithium batteries, and/or related methods of manufacture, use, and/or the like, and/or combinations thereof are disclosed or provided.

The present invention may be embodied in other forms without departing from the spirit and the essential attributes thereof, for example, in one embodiment, a lead acid battery separator can be produced by using PE instead of PP and by making it about 50 μm to 500 μm thick. Accordingly, reference should be made to the appended claims, rather than to the foregoing specification, as indicating the scope of the invention.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" can be used in place of "comprising" and "including" to provide for more specific embodiments of the invention and are also disclosed. "Exemplary" means "an example of" and is not intended to convey an indication of a preferred or ideal embodiment. "Such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

We claim:

1. A membrane comprising:
 a microporous polymer film made by a dry-stretch process and having substantially round shaped pores, and a ratio of machine direction tensile strength to transverse direction tensile strength in the range of 0.5 to 6.0, and porosity in the range of 50% to 80%, a mean flow pore diameter from about 0.050 to about 0.50 microns, and a JIS Gurley of from about 20 to about 70 seconds;
 wherein the microporous polymer film provides a battery with at least 3 C charge and/or discharge performance.

2. The membrane according to claim 1 wherein the polymer film comprising at least one of a semi-crystalline polymer and a semi-crystalline polymer having a crystallinity in the range of 20-80%.

3. The membrane according to claim 1 wherein said polymer film comprises at least one polymer selected from the group consisting of polyolefins, fluorocarbons, polyamides, polyesters, polyacetals (or polyoxymethylenes), polysulfides, polyvinyl alcohols, co-polymers thereof, and combinations thereof.

4. The membrane according to claim 1 wherein an average pore size of said microporous polymer film being in the range of 0.09 to 0.99 microns.

5. The membrane according to claim 1 wherein said microporous polymer film having a porosity in the range of 60-80%.

6. The membrane according to claim 1 wherein said transverse tensile strength being ≥500 Kg/cm$^2$.

7. The membrane according to claim 1 having a thickness in the range of 10-25 microns, a porosity in the range of 60-80%, a transverse direction (TD) tensile strength in the range of 500-700 Kg/cm$^2$, a machine direction (MD) tensile strength in the range of 700-1000 Kg/cm2, and a MD/TD tensile strength ratio in the range of 1.4-1.6.

8. The membrane of claim 1 wherein the microporous polymer film provides a battery with a discharge rate of at least 5 C.

9. The membrane of claim 1 wherein the microporous polymer film provides a battery with a discharge rate of at least 10 C.

10. A battery separator comprising the membrane of claim 1.

11. The battery separator of claim 10 wherein the membrane being at least one ply of a multi-ply membrane.

12. The battery separator of claim 11 wherein the plies of the multi-ply membrane are laminated to one another.

13. The battery separator of claim 10 wherein the membrane being all plies of a multi-ply membrane.

14. The battery separator of claim 10 wherein the plies of the multi-ply membrane being made of the same materials.

15. The battery separator of claim 10 wherein the plies of the multi-ply membrane being made of differing materials.

16. A battery comprising the battery separator of claim 11.

17. A multi-layered membrane structure comprising the membrane of claim 1.

18. The multi-layered membrane structure of claim 17 wherein the plies of the multi-ply membrane are co-extruded.

19. The multi-layered membrane structure of claim 18 wherein the plies of the multi-ply membrane being made of the same materials.

20. The multi-layered membrane structure of claim 18 wherein the plies of the multi-ply membrane being made of differing materials.

21. A device having a membrane, the membrane being the membrane according to claim 1, wherein the device being: a battery, cell, battery pack, system, electronic device, vehicle, or fuel cell.

* * * * *